United States Patent [19]

Cox et al.

[11] 4,300,870
[45] Nov. 17, 1981

[54] PUMP CHAMBERS MINIMIZING FORMATION OF DEPOSITS

[75] Inventors: Charles E. Cox, Norristown; Roger V. Eeckhout, Warminster, both of Pa.

[73] Assignee: SCM Corporation, New York, N.Y.

[21] Appl. No.: 29,493

[22] Filed: Apr. 12, 1979

[51] Int. Cl.³ .............................................. F04B 19/24
[52] U.S. Cl. ........................................ 417/53; 99/306; 99/307; 417/207
[58] Field of Search ................. 417/207, 208, 209, 53; 99/281–283, 306, 300, 304, 307, 302 R; 219/275, 316; 122/DIG. 13, 235 N; 165/84

[56] References Cited

U.S. PATENT DOCUMENTS

| | | | |
|---|---|---|---|
| 590,626 | 9/1897 | Pardo | 99/304 X |
| 1,840,834 | 1/1932 | Davis | 165/84 X |
| 2,856,842 | 10/1958 | Schwaneke et al. | |
| 4,142,840 | 3/1979 | Kemp | 417/209 |

FOREIGN PATENT DOCUMENTS 1091249 10/1960 Fed. Rep. of Germany.
7602306 4/1977 Fed. Rep. of Germany.

*Primary Examiner*—William L. Freeh
*Assistant Examiner*—Edward Look
*Attorney, Agent, or Firm*—Armand G. Guibert; Ernest F. Weinberger

[57] ABSTRACT

Pump chambers usable in beverage makers, for example, have a liquid-contacting heated surface provided with abrupt discontinuities—e.g. sharp edges or corners—to promote flaking-off of mineral deposits. These edges may be fins of rectangular or triangular cross-section.

19 Claims, 10 Drawing Figures

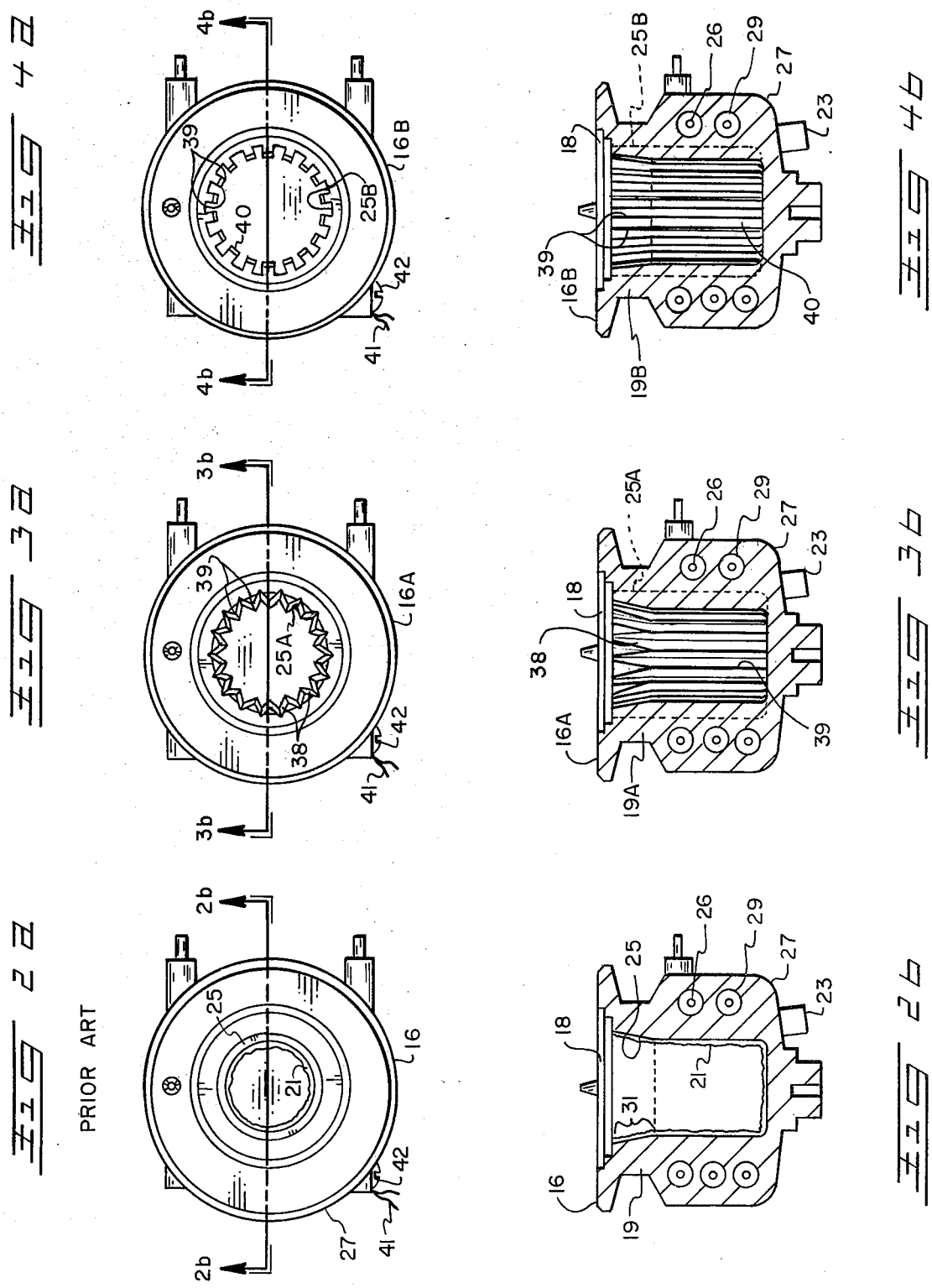

PUMP CHAMBERS MINIMIZING FORMATION OF DEPOSITS

BACKGROUND OF THE INVENTION

1. Field of the Invention

This invention relates to improvements in pump chambers of the type used in beverage makers wherein water in the chamber is heated to boiling to force the water up a supply tube into an infusion basket which holds the beverage ingredients or other material to be infused. More particularly, the invention relates to a chamber structure which minimizes the tendency for stable mineral deposits to form on the chamber wall.

2. Description of the Prior Art

Pump chambers of the type in question have long been used in percolators and automatic coffee makers. In general, the heated wall contacting the liquid within the chamber (or "well" as it will be termed hereinafter for simplicity, although the chamber can be of any desired shape—including long, relatively shallow chambers) has been smooth, that is, formed by an element of revolution. Where the water supply has had a relatively high mineral content, so-called "hard" water, it has been quite common for the repeated heating cycles attendant upon brewing of the beverages to cause deposition of successive thin layers of minerals (termed "waterstone", hereinafter for convenience) which cling to the smooth wall and effectively insulate it. With respect to the mineral content of water, it may be pointed out that the problem is a general one—even in the 100 largest cities in the U.S. there are some who must use water with hardness of about 180 parts per million or higher (U.S. Geological Survey, 1962 per Todd, K. K., Ed. The Water Encyclopedia, Water Information Center, Huntington, N.Y., 1970).

In the past, the above-described problem has been solved by requiring the user to scour the interior of the pump well or treat it with vinegar (acid) periodically (monthly, for instance, if the pump well is in a coffee pot used daily) but this is a nuisance and oftentimes overlooked. As an alternative, it has been suggested in prior art U.S. Pat. No. 3,856,435 to solve the problem by making the pump in two sections—an upper housing and a lower housing (i.e. the well proper)—using materials having different thermal properties, e.g., the upper housing being made of a material of lower thermal conductivity than that of the material used for the well. Such requirements for different materials make the device generally more costly. In addition to the foregoing, we have also investigated various other approaches for solving the problem of mineral buildup. In one approach, coatings of materials which enhance release of the deposited layers (e.g. materials such as silicone elastomers) were applied to the walls, but these materials were themselves insulators, so the coatings increased the temperature at the exterior just as the mineral deposits did. In view of the insulative aspect of the solid release material, another approach involved applying to the wall a very thin film of an edible oil, but improvement was only transitory, the film apparently wearing off such that once it was gone, pump temperature began to climb at a rate similar to that for a standard pump, i.e. one without the surface treatment. Yet another approach involved polishing the wall surface but that too was relatively ineffective, as will be discussed subsequently. Likewise, it was thought that mechanical agitation might be beneficial, so a marble was placed in the well and allowed to "rattle" during cycling to chip away the waterstone. No effect on rate of waterstone buildup was noted. Also, use of a seeding technique was a possibility suggested in the literature on saline water conversion where a decrease in mineral deposition was noted when a slurry of particles of like nature to the mineral deposits was entrained in the water flow. The theory was that the lowest energy state would be achieved by deposition on a like material. Accordingly, we placed calcium carbonate chips in the well, but again no beneficial effect was noted. Lastly, use of pins (wires) inserted in the base of the well was investigated, but this achieved little improvement in reducing waterstone buildup in the major area of deposit, i.e. the vertical walls.

From the foregoing, it is seen that there is need of further improvement in pump wells to make the performance of such wells less sensitive to the presence in the water of minerals which tend to deposit within the well and interfere, ultimately, with proper operation of the device utilizing the well.

SUMMARY OF THE INVENTION

The present invention sets forth a method and apparatus in which a chamber for heating water having a mineral content is provided with several discontinuities formed on an internal surface thereof contacting the water, the discontinuities reducing the accumulation of mineral deposits on that surface. The apparatus includes a chamber, an inlet for admitting the water into the chamber, heating means and an outlet for the heated water; the chamber having an internal surface contacting the water to be heated and another surface contacting the heating means, the internal surface accumulating thermally-insulating mineral deposits in relation to the mineral content of the water and several discontinuities being formed on the internal surface so as to reduce such accumulation of mineral deposits.

In particular embodiments, the invention comprises a pump well with a series of sawtooth shaped fins forming the inner surface of the well, or even more preferably, a series of fins with substantially square tooth shape forming that surface.

Accordingly, a principal object of the invention is to increase the reliability and long term efficiency of heated pump wells used in household devices such as beverage makers.

More specifically, it is an object of the invention to provide improved heated pump wells which do not require periodic manual scouring or chemical cleaning or the use of water having a low mineral content.

Other advantages and features will become evident from the following description and claims taken in conjunction with the appended drawing.

BRIEF DESCRIPTION OF THE DRAWINGS

FIG. 2a is a plan view of a prior art heated pump well, the inner walls being visibly smooth.

FIG. 2b is a cross section elevation of the pump well of FIG. 2a along plane 2b—2b.

FIG. 3a is a plan view of a first embodiment of a heated pump well according to the invention.

FIG. 3b is a cross section elevation of the pump well of FIG. 3a along plane 3b—3b.

FIG. 4a is a plan view of a second, more preferred, embodiment of a heated pump well according to the invention.

FIG. 4b is a cross section elevation of the pump well of FIG. 4a along plane 4b—4b.

DETAILED DESCRIPTION OF THE PREFERRED EMBODIMENTS

Figure 1:
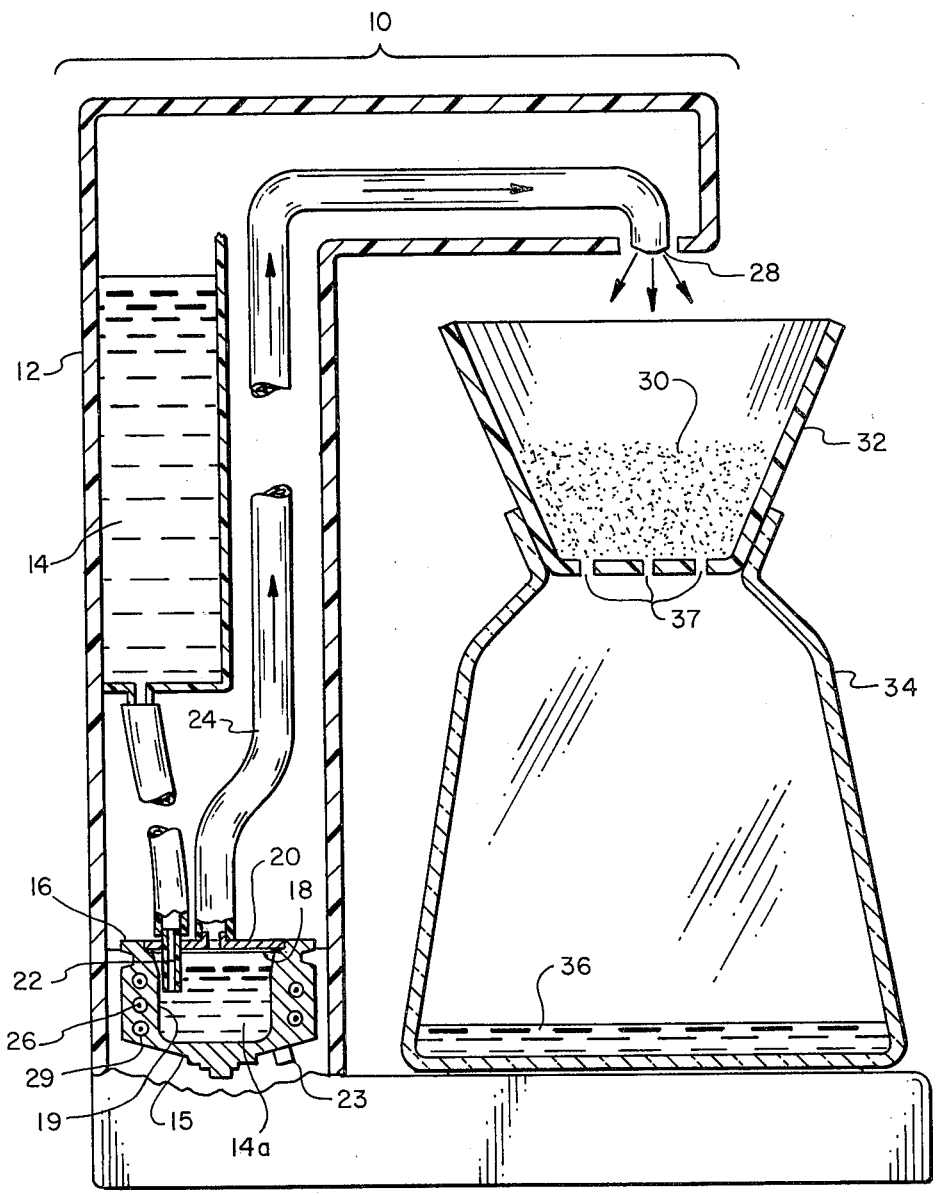
FIG. 1 is a partially sectioned elevation view of a beverage-making device in which a heated pump well according to the invention can be used, the pump well being shown generally at the lower left.

As illustrated in FIG. 1, a beverage making device 10 has the following general components: a reservoir 12 containing a supply of water 14, a pump chamber (or well) 16 having an upper opening 18 sealed by a cover plate 20 with a fine tube 22 which allows water 14 from reservoir 12 to enter pump well 16. A valving mechanism (a simple thin plate of known design, for example) could be added, if desired, to insure unidirectional flow with respect to reservoir 12 rather than depend upon high flow resistance of fine tube 22 to limit the amount of back flow. Cover plate 20 has affixed to it a relatively large pipe or conduit 24 for supplying water to the beverage ingredients. Water 14a in pump well 16 is heated by supplying energy from the usual household 120 volt source (not shown) to an electric heating coil 26. Because of the high back flow resistance of tube 22, most of the heated water will pass via conduit 24 to the top of device 10 where it exits through one or more outlets 28 and is sprayed on the beverage ingredients 30, e.g. ground coffee beans, held in a basket 32 supported in the upper end of a pot or other receptacle 34. After extracting the solubles from the ingredients 30, the solute-rich liquid 36, i.e. the coffee, passes in known fashion through perforations 37 in the bottom of basket 32 and is collected in pot 34.

More specifically, pump wells 16 are generally cup shaped and may have a flat base 15 with a generally vertical wall 19 around the periphery of base 15 and an opening 18 on top. The pump well is usually a die cast aluminum unit for low cost, efficient heat transfer. Disposed within the wall 19, as by casting in place for good thermal contact with the wall material, there is an electrical resistance element in the form of the coil 26 for heating liquid within the cup. Coil 26 is preferably formed from a tubular, metal-sheathed, insulated resistance wire of known type with the sheath 29 in intimate contact with the aluminum throughout, thus providing good thermal contact as mentioned above. Water 14 is continually introduced into pump well 16 from reservoir 12 as long as the supply lasts, and since the amount of water 14a in pump well 16 is relatively small at any one time, the heating process is rapid enough to provide an immediate and continuous supply of hot water up to the limit of reservoir 12. The hot water is directed upwardly through conduit 24 into basket 32 containing ground coffee beans 30, for example, as mentioned previously.

A thermostat 23 is located against the pump base 15, (or proximate wall 19, if desired) in order to sense the temperature of the pump and control the power input to element 26. When the pump temperature exceeds a predetermined value, thermostat 23 (a bi-metallic element forming part of the power circuit, for example) will open to de-energize heating element 26. This will occur, for example, when the temperature is rising rapidly because there is no liquid in pump well 16, as will normally be the case after brewing of a batch of beverage has been completed in the device of FIG. 1.

Mineral deposits (waterstone) accumulate on the inner surface 25 of vertical pump well 19 (see FIG. 2b) at a rate dependent upon the mineral content of the water and the frequency of use of the beverage making device. Over an extended period of use, these deposits will become thick enough to effect insulation of wall 19 and thus alter the heat transfer from heating element 26 inward through surface 25 of wall 19 to the water 14a. Because the heat generated by element 26 is constant, the temperature at element 26 must increase and thereby necessarily increase the heat flow outward through the exterior surface 27 of wall 19, raising the temperature of that surface, which is sensed by thermostat 23 for control purposes. Under these conditions, the added insulation of the waterstone deposit 21 can cause thermostat 23 to open prematurely, heating element 26 being de-energized while there is still water in pump well 16 and before the coffee making process, say, has been completed, much to the annoyance of the person brewing the coffee. This condition will be referred to hereinafter as "early shutoff" or "ESO".

We have discovered that the foregoing problem can be solved by providing sharp edges 39 on the inner, water-contacting surface 25 of the pump well wall 19, these edges being exemplified by the tips of vertically extending triangular fins or "sawteeth" 38 of pump well 16A in FIG. 3a, 3b or more preferably the edges 39 at the corners of "square tooth" fins 40 of pump well 16B in FIGS. 4a, 4b. This structure promotes sloughing of the waterstone due, it is believed, to the fact that edges 39 induce cracking and flaking of deposits because of the mismatch between the thermal expansion of the mineral deposits (relatively low) and that of the substrate (relatively high, the material usually being cast aluminum, as mentioned previously). Once initiated, this sloughing process is believed to be augmented by inherent turbulence of the water being heated within pump well 16A or 16B or perhaps by infiltration of water through the cracks and into the interface between the deposit 21 and surface 25A (or 25B) or wall 19A (or 19B). The fact that the path of water 14 into and out of a well 16A (or 16B) is generally in line with the fins 38 (or 40) may also have a bearing on the ease of lifting off the flaked deposits 21.

To demonstrate the effectiveness of the inventive concept, accelerated testing of the various wells was done in a fixture—termed the "waterstone buildup fixture"—that cycled the pump six times per hour.

Though not sketched, the test fixture contained the essential elements of FIG. 1 except for addition of a return tube for recirculating the water and a means for measuring the temperature of the wall 19. For this latter purpose, a thermocouple 41 was attached to the external surface 27 of each pump well by fastening under a screw head 42. Each cycle consisted of filling pump well 16 (or 16A or 16B) with 2 ounces of water, heating the water 14a to pump it up conduit 24 and allowing it to drain back through reservoir 12 into the well 16 (or 16A or 16B), thus recycling the water until it all boiled away, causing the sidewall temperature to rise to the point where thermostat 23 would cut off the power to coil 26; and then cooling the pump almost to room temperature before beginning another cycle. The water used in these tests had about 180 ppm hardness.

The above-described fixture was used in performing extensive tests on wells with fins having either the triangular (saw) tooth configuration 38 or the square tooth configuration 40. For both configurations, the corresponding test units for well-type 16A and 16B had 18 fins on the interior surface 25A (25B, respectively) of wall 19A (19B, respectively). The sawtooth fins 38 provided approximately 59% more surface area than the smooth surface of standard pump well 16 (the inner diameter of this last being about 1¼ inches or 3.2 cm). The sawtooth fins 38 were about 0.1 inch deep with a base about 0.2 inch wide (0.25 cm×0.51 cm). The square tooth fins 40 had twice as many edges 39 as the sawtooth fins 38, of course, and provided a surface area approximately twice that of the standard pump well 16. The fins 40 in pump well 16B were about 0.1 inch wide by 0.1 inch deep and were spaced 0.1 inch apart (0.25 cm×0.25 cm×0.25 cm). In each case, the edges 39 had an internal angle of about 90°.

It should be noted that for the modified pump wells initially tested, the fins 38, 40 were formed by machining standard pumps 16 to remove material from wall 19, though this method left too thin a "skin" of material over the sheath 29 of heating element 26 in terms of good manufacturing practice. Also, because of a flared portion 31 at the top of standard pump wells 16, the teeth 38, 40 of the modified wells were truncated in this region as can be seen from FIGS. 3a, 3b and 4a, 4b. In a production pump with die cast fins, the section between sheath 29 and well surface 25A or 25B must therefore be somewhat thicker than in the above-described test units and truncation of the teeth 38, 40 preferably avoided. The thicker wall results in an increased pump operating temperature, as will be seen from test data on a pre-production cast aluminum square tooth well 16B2. This unit (not shown) was not to the desired final specifications because it had a wall 19B approximately as thick as the wall 19 of a standard well 16 and, therefore, much thicker than that of the machined square-tooth well 16B. Further, the teeth 40 for unit 16B2 as compared to unit 16B were only half as deep and were about ⅜"(1 cm) shorter, leaving a smooth-surfaced gap between opening 18 and the top of teeth 40. Because of the smaller depth of the teeth in well 16B2, the surface area provided was more nearly equal to that provided by the sawtooth well 16A. Despite these differences, the unit was nonetheless subjected to accelerated test. It may also be mentioned that because casting requires ready core removal for low cost and quality, "square tooth" production units have a tooth cross-section more like a symmetrical trapezoid—the sides being defined by radii centered on the axis of the pump (the internal angle at edges 39 for the cast unit being about 95°). Such changes do not impede the flaking of mineral deposits.

Figure 5:
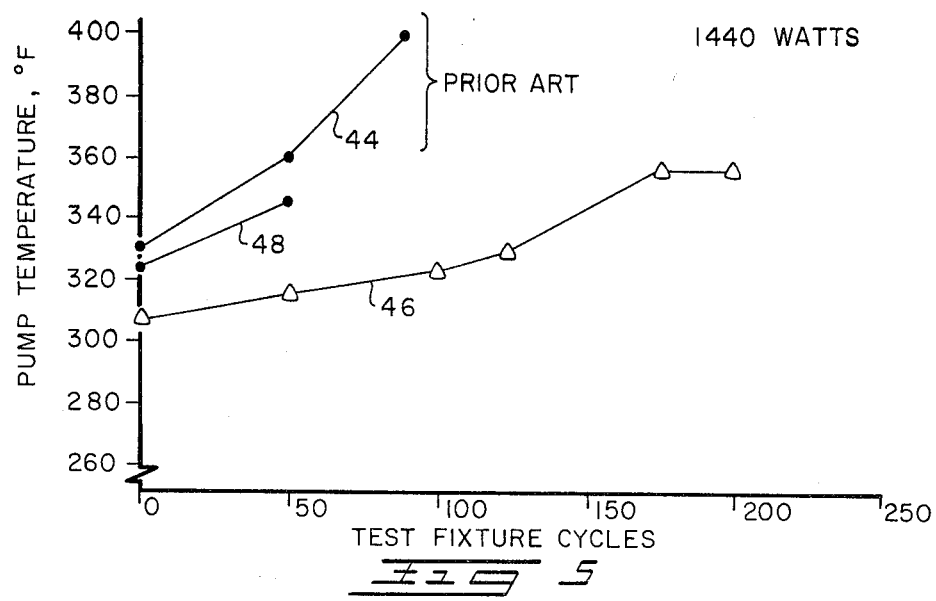
FIG. 5 is a graph showing sidewall temperature (a measure of waterstone buildup) as a function of the number of pump cycles for a prior art pump well according to FIGS. 2a, 2b (both with a standard surface and also as modified to have a highly polished surface), and for a modified pump well according to the first embodiment of the invention (FIGS. 3a, 3b), all wells being heated by 1440 watt electrical units.
Figure 6:
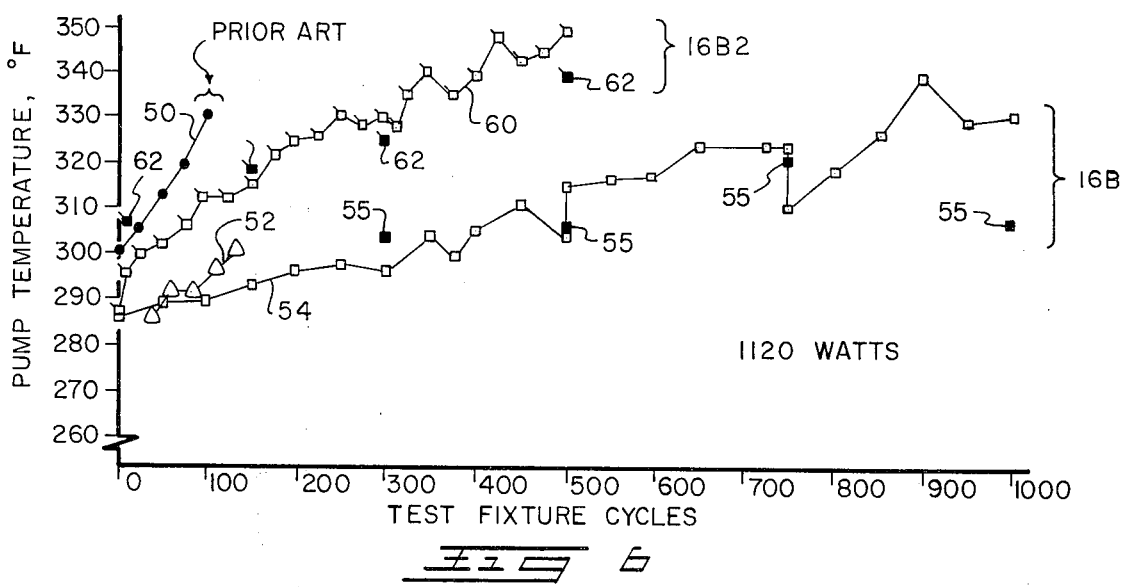
FIG. 6 is a graph showing sidewall temperatures as a function of the number of pump cycles for a prior art pump well (standard surface) according to FIGS. 2a, 2b and for pump wells modified according to both embodiments of the invention (FIGS. 3a, 3b and FIGS. 4a, 4b), all wells being heated by 1120 watt electrical units.
Figure 7:
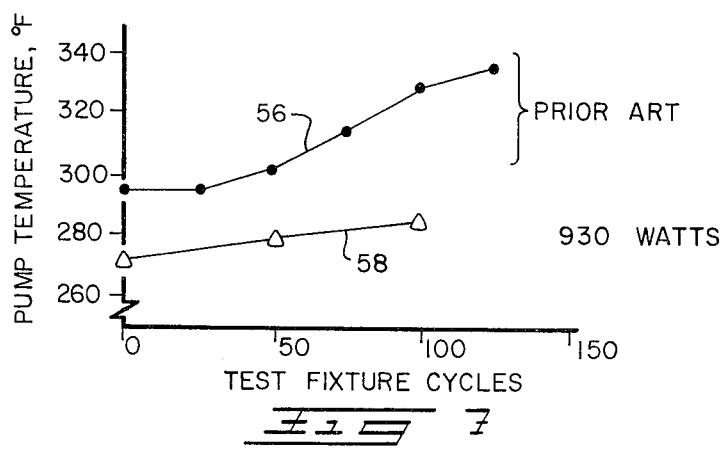
FIG. 7 is a graph showing sidewall temperatures as a function of the number of pump cycles for a prior art pump well (standard surface) according to FIGS. 2a, 2b and for pump wells modified according to the first embodiment of the invention (FIGS. 3a, 3b), all wells being heated by 930 watt electrical units.

The accelerated test data for the just-described wells are shown in FIGS. 5–7, to be discussed next. It will be observed that the standard well and sawtooth well were tested at several power inputs, the effect of decreasing the power being mainly to lower the sidewall temperatures, the relative slopes of the curves being unaffected, in general. As evident from examination of these figures, particularly FIG. 6, both configurations give improved performance over that of a standard pump well 16, but—other things being equal—the square tooth pump well 16B is superior to the comparable sawtooth pump well 16A.

Before beginning more extensive discussion of these figures, one comment must be made regarding the data presented therein—namely, that each "curve" is based on data for one well only (the term "curve" is used herein for convenience, even though the individual points are connected by straight lines). Some inaccuracy in the data is to be expected, therefore. As a gauge of the magnitude of this inaccuracy, we refer to still other tests in which "before" and "after" initial wall temperatures were obtained for those standard wells subsequently modified to the toothed form by machining. In some cases, these wall temperatures were also measured at two different heat inputs to the well, possible changes caused by mineral deposition during the intervening one or two cycles being believed minimal. Thus, at 1440 watts input, the initial wall temperature of eight standard wells 16 ranged from 320° F. to 337° F. (160° C. to 169° C.) with an average of 328° F. (164° C.), yet at 1120 watts input, the initial wall temperature of three of the eight standard wells 16 had a spread of only 1° F. (0.6° C.) the average being 300° F. (149° C.). These same three units—it should be mentioned—fell within±4° F. (2.2° C.) of the average at the higher wattage input. At 930 watts input, the initial wall temperature of three standard wells 16—including another two of the first-mentioned eight—ranged, conversely, from 275° F. to 294° F. (135° C. to 146° C.) the average being 286° F. (141° C.) and the lowest temperature and greatest deviation being obtained with one of the two wells from the original group of eight. Similar results were obtained with sawtooth wells 16A, in general, the ranges being narrower (±2° F.) and the average temperatures being lower as power input decreases (this last being expected, of course). The above data show clearly that from unit to unit of any one type, a maximum deviation of as much as 11° F. (6° C.) could arise even at the lowest power input. Accordingly, it is the relative slopes of the various curves which are important rather than any specific values.

FIG. 5 shows sidewall temperatures (as determined with thermocouple 41 lodged under screwhead 42 and with a 1440 watt input to the electrical heating unit 26) for various wells as a function of cycles of operation in the previously described accelerated test fixture. In FIG. 5 the sawtooth configuration of FIGS. 3a, 3b results in the temperature of the wall 19A of well 16A being about 23 degrees lower initially than the temperature at the same location on a standard well 16. While this is not too surprising if one considers the more efficient heat transfer achievable with the internally finned surface of well 16A, the lower temperature afforded by the finned structure does contribute, however, to delaying the occurrence of "early shutoff"—a fact apparently overlooked by others seeking a solution to the problem. The really surprising feature, of course, is the much lower slope of the data for the modified unit. This lower slope contributes more significantly toward preventing "early shutoff", although the lower temperature due to the above-mentioned fin effect is not negligible. In FIG. 5, curve 44 for the unmodified or "standard" well 16 shows a rise of about 0.7° F. (0.4° C.)/cycle, presumably due to the progressive increase in thickness of the mineral deposits 21 on surface 25 of wall 19. In contrast, curve 46 for well 16A (modified to contain "sawtooth" fins 38 on surface 25A of its wall 19A), shows a rise of only about 0.17° F. (0.09° C.)/cycle in the early cycles. The identically-valued last two points of curve 46 may be the result of the previously-mentioned inaccuracy of measurement or may possibly indicate that leveling off (or dropping back from some higher temperature at an undetermined point intermediate the last two) occurred because of sloughing of an accumulation of the mineral deposits 21—which sloughing occurred at random times and locations during the cycling (as is more evident in FIG. 6), such occurrence being revealed by patchiness of the mineral deposits on visual inspection of the interior of the modified well 16A. Testing of this unit was terminated after 200 cycles.

Also shown in FIG. 5 is a curve 48 giving the temperature vs cycles of operation for a slightly modified standard type of well 16, one having a polished interior surface for wall 19. While the initial temperature is about 6° F. (3.3° C.) lower, this is not believed significant, being within the expected inaccuracy of measurement (as discussed earlier). Furthermore, the slope of curve 48 is only moderately decreased as compared to that of curve 44, being about 0.42° F. (0.23° C.)/cycle. The improvement being rather limited, testing of this unit was terminated after 50 cycles.

For reasons of extending the useful life of the wells, the wattage specification for production units was reduced to 1120 watts, so the tests on the machined square-tooth well 16B (type shown in FIGS. 4a, 4b) and the pre-production sample of cast unit 16B2 were performed at that input. Measurements on the standard pump well 16 and the sawtooth well 16A were partially repeated, of course, at the lower input of 1120 watts to permit better comparison of the performance of both embodiments of the invention. The results are shown in FIG. 6 (note the scale change as compared with FIG. 5), where it is seen that at this lower power input, curve 50 for the unmodified or standard pump well 16 exhibits a slope of about 0.3° F. (0.17° C.)/cycle, while the slope of curve 52 for sawtooth well 16A is again considerably lower at about 0.15° F. (0.08° C.)/cycle, and curve 54 for square-tooth well 16B (which was tested on the above-described waterstone buildup fixture for the longest period—1000 cycles, as is evident) has the smallest slope at roughly 0.05° F. (0.03° C.)/cycle and appears to oscillate (apparently with the buildup and removal of mineral deposits) after about 300 cycles and to level out somewhat from approximately 500 cycles to 1000 cycles. Compared to the last point of the prior art curve 50, the square-tooth configuration of curve 54 provides roughly a nine-fold longer life.

From the 300th cycle on, ten-cup pumping runs (generally three cycles of simulated "brewing" activity) were intersperced between about every 200–250 of the test fixture cycles described previously. The data for these ten-cup "brewing" runs (solid black squares 55) were obtained either in the accelerated test fixture, cool reservoir water then being pumped in normal fashion, i.e. without recirculation; or by actually removing the pump well from the accelerated test fixture, inserting it in a production-type beverage maker 10, and then operating the beverage maker 10 for the above-mentioned normal "brewing" cycles before returning the well to the test fixture. In either case, the sidewall temperature was measured during the last normal cycle. This variation of the accelerated test is believed of particular significance because much greater agitation occurs during normal brewing than is the case for the test fixture cycles—attributable, it is believed, to the fact that "brewing" is accompanied by continual introduction of cold water 14a into the hot well 16A or 16B, setting up thermal stresses even more conducive to the flaking of deposits 21.

The black squares 55 representing temperatures measured during the "brewing" runs are seen to follow generally the trends established by the accelerated test fixture data (open squares) of curve 54 for square-tooth well 16B. Although they are not always lower than the immediately preceding point on curve 54, as would be expected from the above-discussion of enhanced flaking in "brewing" runs, any differences are generally within the extremes of accuracy previously discussed, i.e. roughly 11° F. (5.8° C.). The rightmost point 55 in FIG. 6 is an exception and is apparently an indication of appreciable sloughing, in view of the 24° F. (13.3° C.) difference in the temperatures measured before and during the "brewing" run.

Also shown in FIG. 6 is a curve 60 for the previously-mentioned pre-production cast aluminum square-tooth well 16B2 (the open square data points for this last also being distinguished by having a tab in the second quadrant). The previously-mentioned greater wall thickness of well 16B2 explains the higher temperatures for curve 60 inasmuch as on this basis that curve should be closer to curve 50 than to curve 54. The important feature, however, is the slope of about 0.15° F. (0.08° C.) up to 200 cycles (the initial temperature point being dropped) with a decreased slope of roughly 0.08° F. (0.04° C.) for a line connecting the points at 200 cycles and 400 cycles and passing through or reasonably adjacent the oscillating points in the balance of segmented curve 60.

"Brewing" runs were also interspersed in testing of pre-production unit 16B2 and are represented in FIG. 6 by the black squares 62 provided with similar tabs in the second quadrant to distinguish them from the "brewing" run data points 55 for machined square-tooth well 16B. Here, too, the "brewing" run data support the general trend of the accelerated test fixture data in curve 60. Inspection of unit 16B2 after the 500 cycles of operation showed a relatively thin coating of mineral material in the area of teeth 40 as compared to a heavy accretion of mineral material in the area of the previously-mentioned gap existing between the top of the teeth 40 and the opening 18. This observation once again confirmed the effectiveness of the fins (i.e. discontinuities) in reducing accretion of mineral deposits by inducing periodic sloughing of portions of such deposits.

To round out the data, FIG. 7 (same scale as in FIG. 5) presents some additional results obtained on standard and sawtooth wells at an even lower power input to the wells—namely, 930 watts. Curve 56 shows the temperature of wall 19 for a standard well at that input as a function of the number of cycles in the accelerated test fixture, the slope being about 0.41° F. (0.23° C.)/cycle if one considers only the data from the 25th cycle. On the other hand, curve 58 for the temperature of wall 19A in sawtooth well 16A shows—as before—a significantly lower slope, it being about 0.12° F. (0.07° C.)/cycle.

In addition to the foregoing test results, other data substantiate the beneficial effects of providing such discontinuities 38, 40 on the inner surface 25 of a heated well 16. These latter data are not strictly comparable to the accelerated test fixture data because they were taken after 1000 hours of dry operation of each well (the thermostat 23 cycling power to the heating element 26 periodically even under these conditions, of course). In these latter tests, at least three samples each of the standard wells 16 and the sawtooth wells 16A were subjected to repeated "brewing" cycles using water at two different levels of hardness: 100 ppm and 224 ppm. Whereas the three standard wells 16 operating with water of about 100 ppm hardness all experienced ESO, i.e. "early shutoff", after about 2000 "brewing" cycles, the three sawtooth units 16A operating with water of that hardness had not experienced ESO after 4000 such cycles, pump temperature during cycling having increased by only 15° F. (8.3° C.), on the average, an indication that "early shutoff" was far from imminent. Further, with the water of over *twice* that hardness (224 ppm), three standard units 16 experienced ESO between about 200 and 500 cycles, whereas three sawtooth wells 16A experienced that same condition only after about 2400 cycles. Thus an improvement substantially greater than 2:1 was indicated under the former conditions of water hardness and at least 4:1 was demonstrated under the latter conditions of more than double the water hardness.

The above description of a pump well in which formation of mineral deposits is reduced, comprises a pump well 16A (or 16B) communicating with beverage ingredients 30 through an outlet conduit 24, and receiving water 14 from a reservoir 12, the well 16A (or 16B) having a wall 19A (or 19B) with an internal surface 25A (or 25B) contacting the water 14a in the well and another surface 29 contacting heating element 26 for purposes of boiling the water 14a; several discontinuities 38, 40 being integrally formed on the internal surface 25A (or 25B) of wall 19A (or 19B) to minimize formation of mineral deposits 21.

While the foregoing description has disclosed the waterstone-reducing discontinuities as being fins of triangular or square cross-section, it will be clear to those skilled in the art that the exact shape is not critical—e.g., pentagonal (more edges) and cuspidate (arcuate side) cross sections would be equally applicable. Likewise, the fins need not be continuous, as they could be interrupted periodically along their length to provide further edges facilitating the cracking and flaking off of mineral deposits. Furthermore, sources of energy other than electrical could be used to heat the water 14a. Other modifications of this nature will be evident to those skilled in the art and these too are intended to fall within the scope of the invention. The presently disclosed embodiments are therefore to be considered in all respects as illustrative and not restrictive, the scope of the invention being defined by the appended claims rather than by the foregoing description, and all changes which come within the meaning and range of equivalency of the claims are therefore intended to be embraced therein.

What is claimed is:

1. In a heated pump chamber for supplying hot water to a utilization device, the pump chamber receiving the water to be heated through an inlet, said chamber communicating with said utilization device through an outlet and comprising a peripheral wall including a portion having an internal surface in contact with the water, heating means associated with said wall for transfer of heat to said water through said internal surface, at least said portion of the wall intervening between said heating means and said water and said internal surface accumulating thermally-insulating mineral deposits thereon in relation to mineral content of the water received; the improvement comprising combination therewith of a plurality of discontinuities formed on said internal surface whereby accumulation of mineral deposits is reduced.

2. A pump chamber as defined in claim 1, wherein said discontinuities are integrally formed on said internal surface.

3. A pump chamber as defined in claim 2 wherein said integrally-formed discontinuities are a plurality of fins projecting from said wall portion into said chamber.

4. A pump chamber as defined in claim 3 wherein said fins each have at least one edge.

5. A pump chamber as defined in claim 1 wherein said discontinuities extend along said internal surface in substantial alignment with the flow path of the water.

6. A pump chamber as defined in claim 1 wherein said discontinuities extend along said internal surface in discrete substantially vertical lines.

7. A pump chamber as defined in claim 1 wherein said discontinuities are a plurality of fins each having at least one edge.

8. A pump chamber as defined in claim 7 wherein said fins are triangular in cross section.

9. A pump chamber as defined in claim 7 wherein said fins are substantially square in cross section.

10. A pump chamber as defined in claim 1, wherein said discontinuities comprise a plurality of angular projections.

11. A pump chamber as defined in claim 10, wherein the angular projections have an edge with an internal angle of about 90°.

12. A pump chamber as defined in claim 11, wherein said angular projections are an integral part of the wall, said edge extending over a major fraction of the wall height.

13. A pump chamber as defined in claim 12, wherein said heating means is an electrical resistance element embedded in said wall.

14. A pump chamber as defined in claim 10, wherein the angular projections have at least two edges with an internal angle of about 90°.

15. A pump chamber as defined in claim 14, wherein said angular projections are an integral part of the wall, said at least two edges extending over a major fraction of the wall height.

16. A pump chamber as defined in claim 15, wherein said heating means is an electrical resistance element embedded in said wall.

17. A method of reducing the accumulation of mineral deposits from water heated in pump chambers having a peripheral wall including an inner surface in contact with the water, heat flowing to the water through the internal surface, comprising the steps of: forming a plurality of discontinuities on the inner surface of the wall prior to the steps of admitting the water into the chamber and heating the water in the chamber, thereby inducing the cracking and flaking of minerals deposited as a result of said heating.

18. The method of claim 17, wherein the step of forming said plurality of discontinuities comprises forming on said inner surface a plurality of members each having at least one edge.

19. The method of claim 18, wherein said at least one edge is linear.

* * * * *